United States Patent [19]

Morita et al.

[11] Patent Number: 4,648,281
[45] Date of Patent: Mar. 10, 1987

[54] TURBINE FLOWMETER

[75] Inventors: Yutaka Morita, Takarazuka; Masayoshi Katayama, Yokohama; Takashi Kato, Kawasaki, all of Japan

[73] Assignees: Osaka Gas Co., Ltd.; Tokico Ltd., both of Japan

[21] Appl. No.: 748,497

[22] Filed: Jun. 25, 1985

Related U.S. Application Data

[63] Continuation-in-part of Ser. No. 695,836, Jan. 29, 1985, abandoned.

[30] Foreign Application Priority Data

Jan. 30, 1984 [JP] Japan .................................. 59-14924

[51] Int. Cl.⁴ .............................................. G01F 1/10
[52] U.S. Cl. .............................. 73/861.91; 73/861.92; 415/142; 415/184
[58] Field of Search .......... 73/861.83, 861.91, 861.92; 415/140, 170 B, 142, 184

[56] References Cited

U.S. PATENT DOCUMENTS

| 3,097,529 | 7/1963 | Jackson et al. |
| 3,238,776 | 3/1966 | Potter ................................ 73/861.91 |
| 3,248,943 | 5/1966 | Francisco, Jr. ................... 73/861.91 |
| 3,398,930 | 8/1968 | Faure-Herman . |
| 3,756,079 | 9/1973 | November ......................... 73/861.83 |
| 3,999,432 | 12/1976 | Conix et al. ....................... 73/861.91 |
| 4,186,603 | 2/1980 | Bae ..................................... 73/861.81 |
| 4,242,039 | 12/1980 | Villard et al. ..................... 415/170 B |

FOREIGN PATENT DOCUMENTS

992091 5/1965 United Kingdom .
1008508 10/1965 United Kingdom .

Primary Examiner—Herbert Goldstein
Attorney, Agent, or Firm—Andrus, Sceales, Starke & Sawall

[57] ABSTRACT

A turbine flowmeter comprises a flowmeter housing through which a fluid to be measured flows, a turbine rotor rotatably provided within the flowmeter housing and comprising a rotor hub and a plurality of blades which are unitarily provided to the rotor hub, a bearing mechanism for mechanically supporting the rotor hub in a rotatable manner by making mechanical contact with the rotor hub, a stationary member which is provided in the flowmeter housing in an opposing manner to the rotor hub, and a dynamic pressure bearing part for to building up a dynamic pressure bearing by the fluid between the rotor hub and the stationary member.

8 Claims, 12 Drawing Figures

TURBINE FLOWMETER

The present application is a continuation-in-part application of the U.S. patent application Ser. No. 695,836 entitled "TURBINE FLOWMETER" filed Jan. 29, 1985 now abandoned.

BACKGROUND OF THE INVENTION

The present invention generally relates to turbine flowmeters, and more particularly to a turbine flowmeter in which a turbine rotor is supported by a mechanical bearing when the flow quantity of a fluid is low and a dynamic pressure bearing acts on the turbine rotor when the flow quantity of the fluid is high, whereby the measuring range of the flow quantity is widened.

Conventionally, a turbine flowmeter is used to measure the flow quantity of gases which are used in homes or in industries. As methods of supporting the turbine rotor in such a turbine flowmeter, there are methods of using (i) a ball bearing, (ii) a pivot bearing, (iii) a slide bearing and the like. The above mentioned methods, however, have disadvantages in that the method (i) requires frequent maintenance, the method (ii) introduces a large wear due to friction when the rotor is rotated at a high speed, and the method (iii) introduces a large frictional resistance with respect to the rotation of the rotor.

Further, in the conventional turbine flowmeter which employs one of the above mentioned supporting methods, the measuring accuracy becomes poor in the low flow quantity region and/or the high flow quantity region, whereby the effective measuring range is narrowed.

SUMMARY OF THE INVENTION

Accordingly, it is a general object of the present invention to provide a novel and useful turbine flowmeter in which the problems described heretofore are eliminated.

Another and more specific object of the present invention is to provide a turbine flowmeter in which a turbine rotor is supported by a one-point supporting type pivot bearing when the flow quantity is small, and as the flow quantity increases there is built up a dynamic pressure bearing and the turbine rotor is also supported by the dynamic pressure bearing as the flow quantity increases. According to the turbine flowmeter of the present invention, the flow quantity can be measured with a high accuracy from the low flow quantity region to the high flow quantity region thus substantially widening the effective measuring range of the flowmeter. The present invention also eliminates the necessity for maintenance which is required when a ball bearing or the like is used.

Still another object of the present invention is to provide a turbine flowmeter comprising a flowmeter housing, and a turbine rotor rotatably mounted in the flowmeter housing. The turbine rotor is provided in the flowmeter housing movable in a direction along a rotation axis by a predetermined amount. The turbine flowmeter further comprises a pivot bearing which supports the turbine rotor when the flow quantity is low, and a dynamic pressure bearing for rotatably supporting the turbine rotor when the flow quantity is large.

A further object of the present invention is to provide a turbine flowmeter comprising a rotor hub which is provided with a plurality of spiral grooves the widths of which are respectively narrowed toward the central part, and a stationary member which is provided in an opposing manner to the rotor hub whereby forming a gap of predetermined thickness therebetween. The plurality of spiral grooves which are rotated together with the rotor hub as the flow quantity increases, induces a pumping action in the gap, whereby a fluid in the gap is compressed to form a film of the fluid, thus building up a dynamic pressure bearing.

A further object of the present invention is to provide a turbine flowmeter comprising a rotor hub and a stationary member which is provided in an opposing manner to the rotor hub whereby forming a predetermined gap therebetween, which stationary member is provided with a plurality of spiral grooves the widths of which are respectively narrowed toward the central part thereof. A fluid in the gap is moved together with the rotation of the rotor hub due to the viscosity of the fluid, as the flow quantity increases and the rotation of the turbine rotor increases subsequently. The plurality of spiral grooves provided to the stationary member induces a pumping action, whereby the fluid in the gap is sucked up into the central part of the spiral grooves and compressed therein to form a film of the fluid in the gap, thus building up a dynamic pressure bearing.

Other objects and further features of the present invention will be apparent from the following detailed description when read in conjunction with the accompanying drawings.

DETAILED DESCRIPTION

Figure 1:
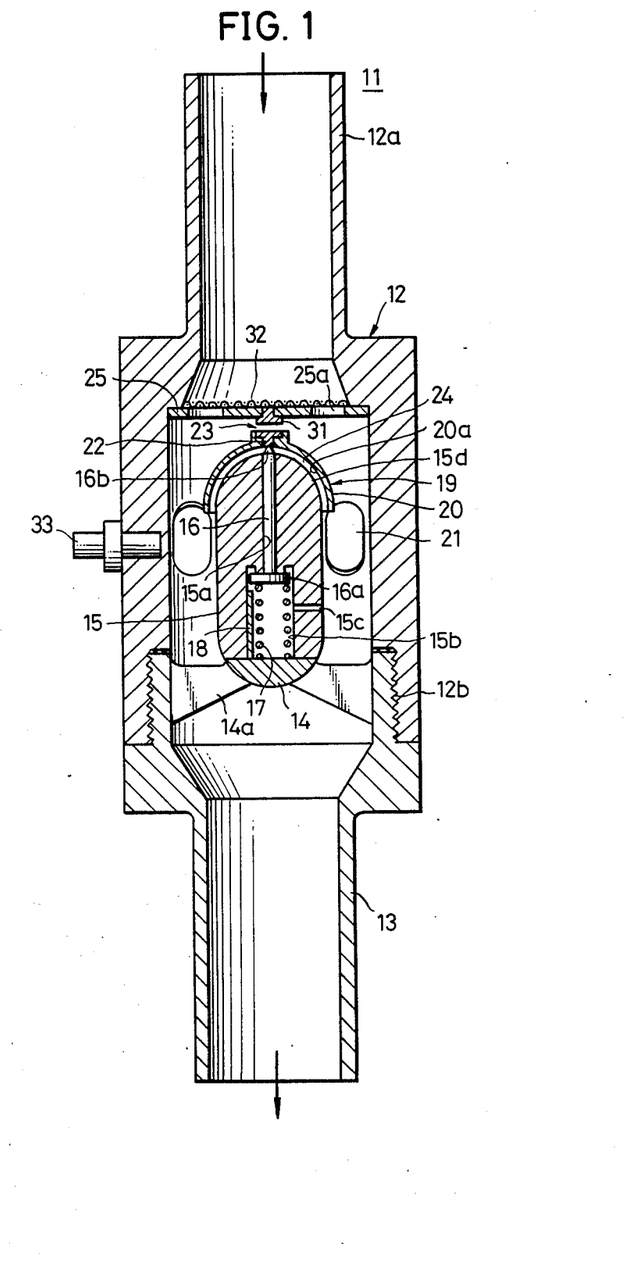
FIG. 1 is a vertical cross section showing the first embodiment of a turbine flowmeter of the present invention.

FIG. 1 shows a turbine flowmeter 11 which comprises a flowmeter housing 12 made of cast iron or cast bronze. The housing 12 is provided with an inlet conduit 12a and an outlet screwed bore 12b to which an outlet conduit 13 is screwed in. The housing 12 is positioned vertically so that the axis of the housing coincides with a vertical line. The inner diameter of the housing 12 is larger than the inner diameters of the inlet conduit 12a and the outlet conduit 13 so as to reduce the pressure loss.

A boss member 14 made of cast iron or cast bronze is integrally formed on an inner surface of the outlet conduit 13 through a plurality of stays 14a. Another boss member 15 is made of die-cast light alloys or formed plastics and is provided with an axial bore 15a, a spring retaining bore 15b, and a pin hole 15c. The boss member 15 is secured on the upper surface of the boss member 14 by a screw or the like. The top (upper end) of the boss member 15 has a hemispherical surface 15d.

Figure 2:
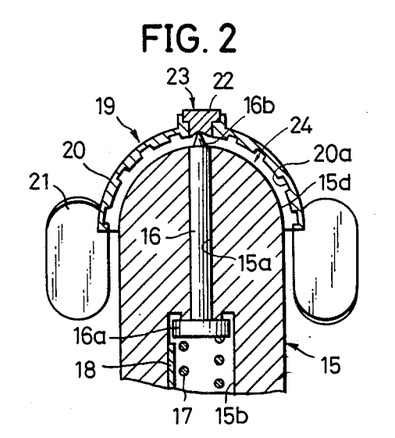
FIG. 2 is an enlarged view showing an essential part of the turbine flowmeter shown in FIG. 1.

A pivot shaft 16 is provided with a collar member 16a at the lower end thereof and a pivot member 16b made of carbides or steels at the upper end thereof as shown in FIG. 2. The pivot shaft 16 is slidably fitted in the axial bore 15a of the boss member 15 in a state movable in the upward and downward directions. The collar member 16a of the pivot shaft 16 is located inside the spring retaining bore 15b. The pivot shaft 16 is urged upwardly by a spring 17. As a result, the collar member 16a is also urged upwardly to make contact with the upper wall of the spring retaining bore 15b, and the pivot member 16b projects upwardly from the boss member 15. Within the spring retaining bore 15b, a stopper 18 is secured to prevent the excessive movement of the pivot shaft 16 in the downward direction.

Figure 3:
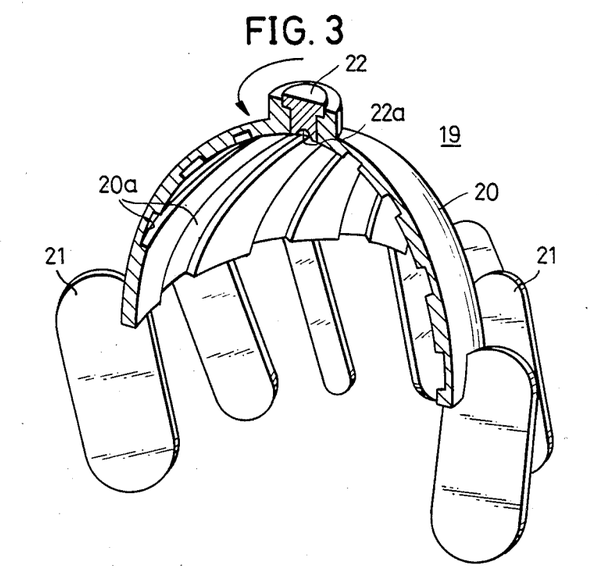
FIG. 3 is an enlarged perspective view, with a part cut away, showing a turbine rotor shown in FIG. 2.

A turbine rotor 19 comprises a rotor hub 20 and a plurality of blades 21 as shown in FIGS. 1 through 3. The rotor hub 20 is a hemispherical bowl made of light alloys such as aluminum alloy or titanium or formed plastics, and the plurality of blades 21 are unitarily provided at the lower part of the rotor hub 20 in a twisted manner to the direction of the rotor hub axis (direction of the fluid flow) by a predetermined angle. At the central part of the rotor hub 20, there is provided a pivot bearing metal 22 made of carbide or gem stone which is fitted into and secured to the rotor hub 20. The rotor hub 20 is also provided with a plurality of spiral grooves 20a on the inner surface thereof as shown in FIGS. 2 and 3. Each spiral groove 20a converges in a counter-direction to the rotating direction of the turbine rotor 19, which rotating direction is to the left (counter-clockwise) in FIG. 3, for example. The width of each spiral groove 20a gradually becomes narrower from the outer periphery toward the inner periphery of the rotor hub 20. The turbine rotor 19 is placed on the boss member 15 as shown in FIG. 2, where the pivot bearing metal 22 is rotatably supported on the pivot member 16b of the pivot shaft 16. A pivot bearing 23 is constituted by the pivot member 16b of the pivot shaft 16 and the pivot bearing metal 22 having a concave 22a. As will be described hereinafter, during operation of the turbine flowmeter 11, a dynamic pressure bearing 24 is built up between the hemispherical surface 15d of the boss member 15 and the inner surface of the rotor hub 20 which is provided with the plurality of spiral grooves 20a.

As shown in FIG. 1, a baffle plate 25 has a plurality of apertures 25a and a stopper 31, and is secured in the flowmeter housing 12 at an inlet area in a perpendicular manner to the in-coming fluid flow. The stopper 31 opposes the pivot bearing metal 22 of the turbine rotor 19 across a small distance and prevents the excessive displacement of the turbine rotor 19 in the upward direction. At the up-stream side of the baffle plate 25, there is located a mesh 32 which screens away large foreign particles and at the same time disturbs the fluid flow so as to eliminate the laminar flow. A rotation sensor 33 of a magnetic reluctance type, a vortex type, or a reluctance type, is embedded in the housing 12 at a position opposing the blades 21 and detects the rotation of the turbine rotor 19.

Next, a description will be given with respect to the operation of the turbine flowmeter 11. A fluid (in the present case, a gas) of which flow quantity is to be measured, flows into the turbine flowmeter 11 from the downward direction through the inlet conduit 12a. The fluid passes through the mesh 32 and the apertures 25a in the baffle plate 25, and pushes the blades 21 of the turbine rotor 19. Since the turbine rotor 19 is supported by a single-point support type pivot bearing 23 in this state, the rotational resistance at the bearing is quite small and the turbine rotor 19 starts to rotate in the direction of the arrow shown in FIG. 3 with a sufficient sensitivity even with respect to an extremely small fluid flow.

As the flow quantity of the fluid gradually increases, the thrust force which urges the turbine rotor 19 downwardly also increases and the turbine rotor 19 is gradually displaced downwardly against the urging force of the spring 17 until the collar member 16a of the pivot shaft 16 makes contact with the stopper 18. Due to the downward displacement of the turbine rotor 19, the gap between the hemispherical inner surface of the rotor hub 20 and the hemispherical outer surface 15d of the boss member 15 gradually becomes smaller. As the rotor hub 20 rotates in the direction of the arrow in FIG. 3, the fluid at the lower marginal area of the rotor hub 20 is sucked up into the grooves 20a due to the viscosity of the fluid and a kind of pumping action of the spiral grooves 20a which pumping action is introduced due to the direction in which the spiral grooves 20a curve and the extend and rotating direction of the rotor hub 20. The sucked up fluid is compressed as it is guided to the central part of the rotor hub 20, and forms a film of fluid in the gap. In this way, the dynamic pressure bearing 24 is effectively built up in the gap between the hemispherical surface 15d and the inner surface of the rotor hub 20 in which the spiral groove 20a is provided. The turbine rotor 19 is mainly supported by the dynamic pressure bearing 24 against the thrust force and is rotated at a high speed.

In this case, the thrust force which the turbine rotor 19 receives from the fluid flow is principally born by the dynamic pressure bearing 24, and as a result, there acts on the pivot shaft 16 only a small force which is sufficient to keep the axis of the turbine rotor 19 on the axis of the pivot shaft 16. Thus, the friction between the pivot member 16b of the pivot shaft 16 and the pivot bearing metal 22 of the turbine rotor 19 is kept extremely small to reduce the frictional wear even when the turbine rotor 19 rotates at the high speed.

When the flow quantity of the fluid is low, the pivot bearing metal 22 of the turbine rotor 19 is supported by the pivot shaft 16 by the single-point support. In this case, the rotational friction of the turbine rotor 19 is small and it is possible to respond to a minute flow quantity with a high sensitivity. On the other hand, when the flow quantity of the fluid is large, the turbine rotor 19 is effectively supported by the dynamic pressure bearing 24. The mechanical friction is in this case greatly reduced at the pivot bearing part so that the turbine rotor 19 can respond and rotate with a high accuracy even with respect to a large flow quantity. Thus, the turbine flowmeter 11 described heretofore can perform the flow quantity measurement with a high accuracy within a wide measuring range from the low flow quantity region to the high flow quantity region. Further, the turbine flowmeter 11 has little mechanical friction at the pivot bearing 23 and the dynamic pressure bearing 24, whereby it almost eliminates the necessity of maintenance of the bearing.

Since the mesh 33 positively disturbs the fluid flow, it is possible to effectively suppress a change in the meter constant due to the change in the flow quantity. Accordingly, the measuring range in which the flowmeter can correctly measure the flow quantity is widened, and at the same time, the effects on the fluid flow from the up-stream side piping is reduced. In the conventional axial flow turbine flowmeter, the meter constant is large when the fluid flow is laminar, and decreases as the fluid flow becomes more turbulent and the flow quantity increases. When the fluid flow becomes completely turbulent, the meter constant increases slightly and approaches a constant value. Because of this reason, it is usual to exclude the above transitional flow region where the measuring error is large from the effective measuring range of the axial turbine flowmeter. According to the turbine flowmeter of the present invention, however, it is possible to perform the flow quantity measurement even in this transitional region with a high accuracy.

Next, second embodiment of the turbine flowmeter according to the present invention will be described in conjunction with FIGS. 4-8.

Figure 4:
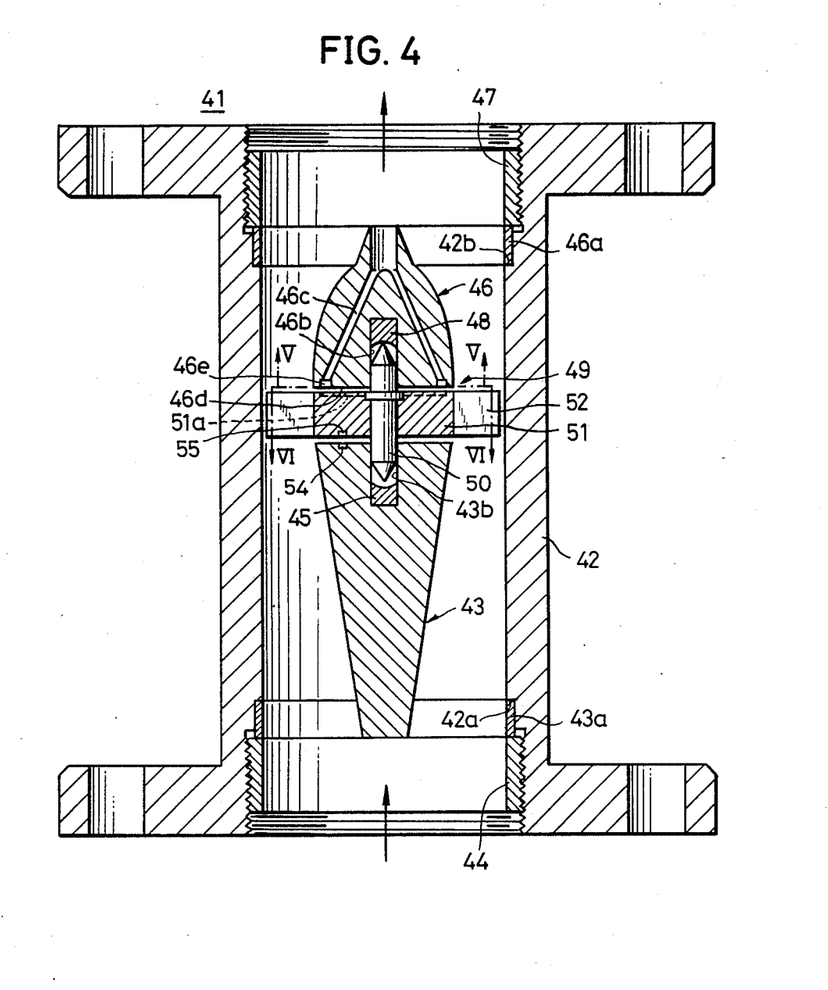
FIG. 4 is a vertical cross section showing the second embodiment of a turbine flowmeter of the present invention.

A flowmeter housing 42 of a turbine flowmeter 41 is arranged vertically so that the axis of the flowmeter housing 42 coincides with a vertical axis. In this embodiment, the fluid flows through the flowmeter housing 42 from the bottom to the upward direction.

An upstream-side cone 43 is inserted in the lower part of the flowmeter housing 42. A ring 43a fits over a step 42a of the flowmeter housing 42 and is secured by a securing ring 44 which is screwed into the flowmeter housing 42 from the bottom of the flowmeter housing 42. The cone 43 has a bearing bore 43b of predetermined depth of the upper end thereof, and a pivot bearing 45 made of carbides or gem stones is embedded into the bearing bore 33b.

A downstream-side cone 46 is inserted into the upper part of the flowmeter housing 42. A ring 46a fits over a step 42b of the flowmeter housing 42 and is secured by a securing ring 47 which is screwed into the top part of the flowmeter housing 42. The cone 46 is provided with a bearing bore 46b of predetermined depth on the lower end thereof, and a pivot bearing 48 is embedded into the bearing bore 46b.

Figure 5:
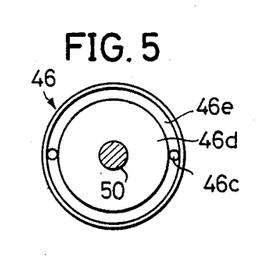
FIGS. 5 and 6 are views in transverse cross section showing the flowmeter along lines V—V and VI—VI in FIG. 4, respectively.

From the center of the upper end of the cone 46 extends a pair of fluid introducing holes 46c in the form of an inverted V-shape. As shown in FIG. 5, the fluid introducing holes 46c communicate to the corresponding pair of openings provided in a ring-shaped groove 46e at a lower surface 46d of the cone 46.

A turbine rotor 49 comprises a rotor shaft 50, a rotor hub 51 which is integrally provided on the rotor shaft 50, and a plurality of blades 52 which are mounted to the rotor hub 51. Both ends of the shaft 50 are fitted into and rotatably supported by the respective bearing bores 43b and 46b of the cones 43 and 46. The upper and lower ends of the shaft 50 are made of carbides or steels. On the upper surface of the rotor hub 51 there is provided a plurality of spiral grooves 51a which converge counterclockwise in FIG. 6, that is, in a counter-direction to the rotating direction of the turbine rotor 49.

Figure 6:
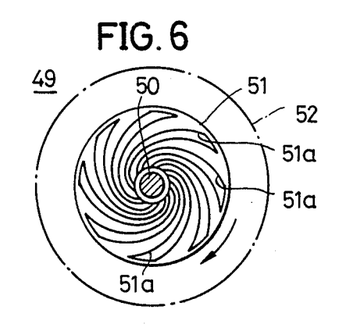

The width of each spiral groove 51a gradually becomes narrower as the groove converges to the center of the rotor hub 51. The outer ends of the spiral grooves 45a do not reach the outer margin of the rotor hub 51 but stop at a positions which corresponds to the ring-shaped groove 46e which is provided at the bottom surface 46d of the downstream-side cone 46. As will be described later, a dynamic pressure bearing 53 is built up between the spiral grooves 51a and the bottom surface 46d when the turbine rotor 49 rotates. In FIG. 6, the outer diameter of the blades 42 is shown by a one-dot chain line.

Figure 7:
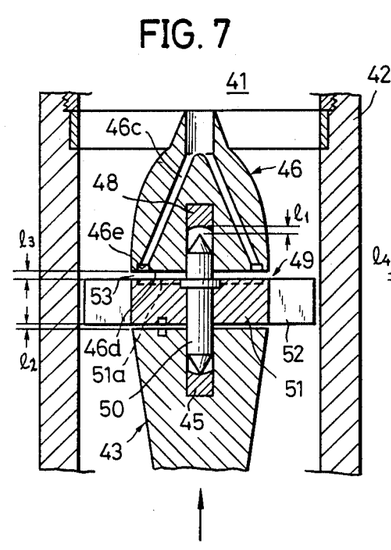
FIGS. 7 and 8 are vertical cross sections showing an essential part of the turbine flowmeter shown in FIG. 4 for cases where the flow quantity is low and the flow quantity is high, respectively.

The bottom end of the rotor shaft 50 contacts the pivot bearing 45 as shown in FIG. 7 when the turbine rotor 49 moves downwardly by due to its own weight, whereby a small gap $l_1$ is formed between the upper end of the rotor shaft 50 and the pivot bearing 45. Another small gap $l_2$ is formed between the bottom surface of the rotor hub 51 and the top surface of the upstream-side cone 43, and still another small gap $l_3$ is formed between the top surface of the rotor hub 51 and the bottom surface 46d of the downstream-side cone 46, where the gap $l_3$ is larger than the gap $l_1$.

A rotation sensor 54 is mounted on the cone 43 at a position facing the rotor hub 51, and a magnet 55 is embedded in the rotor hub 51 at a position facing the rotation sensor 54.

Next, the operation of the turbine flowmeter 41 will be described. The fluid to be measured flows into the flowmeter housing 42 from the bottom of the housing 42 in the upward direction as shown in FIG. 4. The fluid pushes the blade 52 and rotates the turbine rotor 49. While the flow quantity is small, the lower end of the shaft 50 is supported by the pivot bearing 45 in the single-point pivot support so that the turbine rotor 49 rotates sensitively even with respect to the small quantity of flow. The turbine rotor 49 rotates in the direction indicated by the arrow in FIG. 6.

Figure 8:
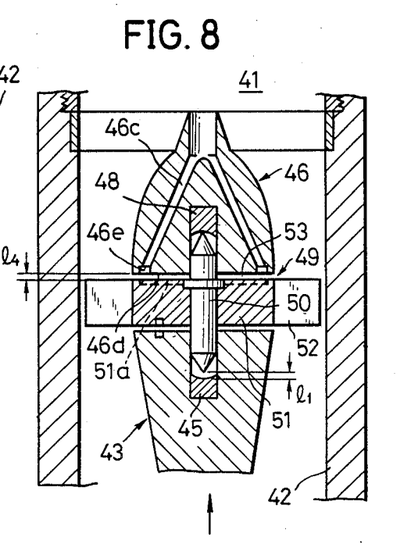

As the flow quantity increases, the upward thrust force acting on the turbine rotor 49 exceeds the downward force due to the weight of the turbine rotor 49, and the turbine rotor 49 is gradually moved upwardly. Thus, the gap $l_3$ between the top surface of the rotor hub 51 and the bottom surface 46d of the downstream-side cone 46 gradually becomes small. When the upper end of the shaft 50 contacts the pivot bearing 48 as shown in FIG. 8, the above mentioned gap $l_3$ assumes a minimum value $l_4$ ($=l_3-l_1$).

A part of the fluid which has passed through the blades 52 is introduced, into the gap ($l_4$) from the outer peripheral part of the gap, and at the same time, another flow of fluid is introduced from the downstream part of the downstream side cone 46 successively through the pair of fluid introducing holes 46c and the ring-shaped groove 46e. The fluid thus introduced is sucked up by the pumping action induced by the plurality of spiral grooves 51a rotating in the arrow direction as shown in FIG. 6, whereby the fluid is compressed as it is guided by the spiral grooves 51a to the center of the rotor hub 51 and forms a film of fluid in the gap ($l_4$).

In this way, the dynamic pressure bearing 53 is effectively built up between the bottom surface 46d of the cone 46 and the spiral grooves 51a of the rotor 51. The turbine rotor 49 is thus mainly supported against the thrust force by the dynamic pressure bearing 53 so that the turbine rotor 49 rotates smoothly at a high speed with a reduced frictional resistance. Since the static pressure in the downstream part of the downstream-side cone 46 is larger than the static pressure around the outer peripheral pat of the gap (l4), the fluid flows into the above mentioned gap through the fluid introducing holes 46c effectively from the downstream side of the cone 46, whereby the flow effectively enhances the movement of the fluid from the outer periphery to the inner periphery by the spiral grooves 51a and effectively helps the build-up of the dynamic pressure bearing 53.

In this case, the upward thrust force which the turbine rotor 49 receives from the fluid is essentially born by the dynamic pressure bearing 53 so that the force which acts on the pivot bearing 48 is extremely small. In a certain situation, the rotor 49 may float away from the pivot bearing 48, and in such a case, the thrust force is completely supported by the dynamic pressure bearing 53 alone. The friction between the upper end of the shaft 50 and the pivot bearing 48 is therefore extremely small and premature frictional wear is prevented.

The turbine rotor 49 is supported by the single-point pivot support between the lower end of the shaft 50 and the pivot bearing 45 when the flow quantity is low. On the other hand, when the flow quantity is high, the turbine rotor 19 is supported by the dynamic pressure bearing 53. Thus, the turbine flowmeter of the present embodiment can also perform accurate measurement of the flow quantity in a wide measuring range as in the case of the first embodiment described before.

Figure 9:
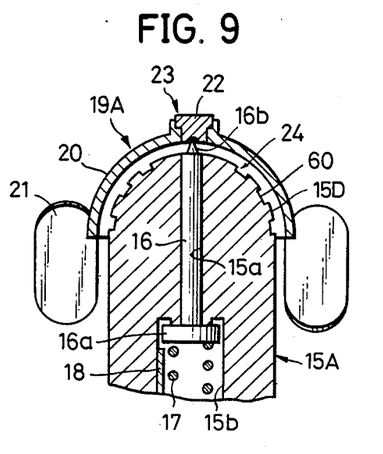
FIG. 9 is an enlarged view showing an essential part of the third embodiment of a turbine flowmeter of the present invention.
Figure 10:
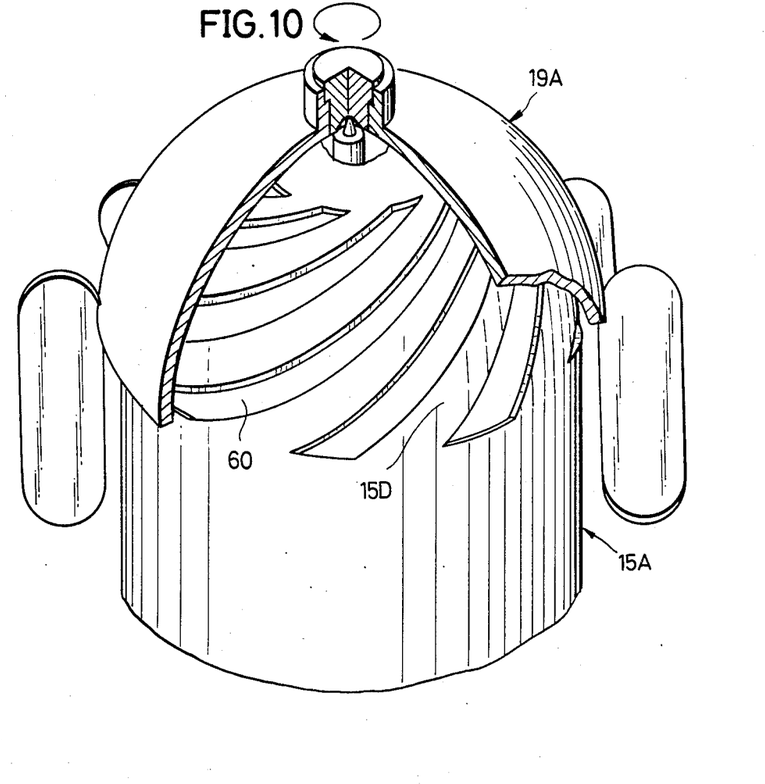
FIG. 10 is an enlarged perspective view, with a part cut away, showing a turbine rotor and a boss member shown in FIG. 9.

Next, the third embodiment of the turbine flowmeter of the present invention will be described in conjunction with FIGS. 9 and 10. In FIG. 9, those parts which are the same as those corresponding parts in FIG. 2 are designated by the same reference numerals and the description thereof will be omitted.

In the present embodiment, the spiral grooves 20a which are provided on the inner surface of the turbine rotor 19 of the first embodiment, are not provided on a turbine rotor 19A. Instead, a plurality of spiral grooves 60 are provided on a hemispherical surface 15D which is located at the distal end of a boss member 15A. The turbine rotor 19A has a smooth hemispherical inner surface which faces the hemispherical surface 15D whereby forming a gap therebetween. In FIG. 10, the rotating direction of the rotor 19A is indicated by an arrow. Each of the spiral grooves 60 on the hemispherical surface 15D converges to the central part of the hemispherical surface 15D in a direction of the turbine rotation, whereby the width of each of the spiral grooves spirally and gradually decreases toward the central part of the hemispherical surface 15D.

In the present embodiment, as in the case of the first embodiment described before, the fluid in the gap between the inner surface of the turbine rotor 19A and the hemispherical surface 15D which is provided with the spiral groove 60 is rotated together with the turbine rotor 19A due to the viscosity of the fluid. As a result, the fluid is sucked up by the spiral grooves 60 of the turbine rotor 19A toward the internal ends of the spiral grooves 60, wherein the fluid is compressed to generate fluid pressure. A film of fluid is then formed in the gap. Thus, a dynamic pressure bearing is similarly built up in the present embodiment.

Figure 11:
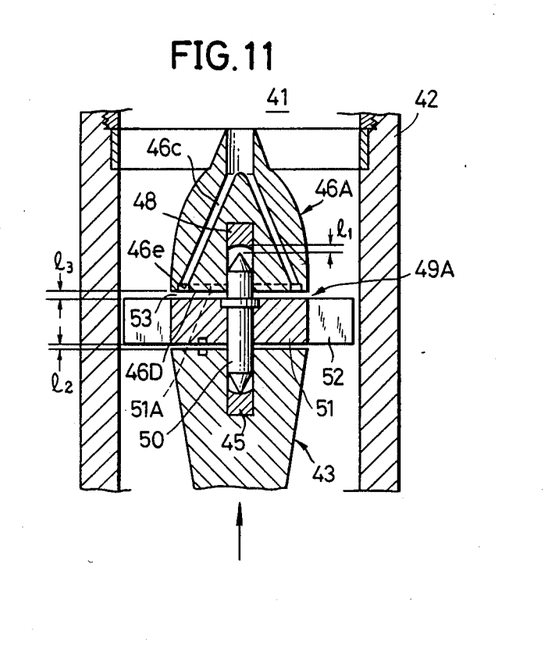
FIG. 11 is a view in a vertical cross section showing an essential part of the fourth embodiment of a turbine flowmeter of the present invention.
Figure 12:
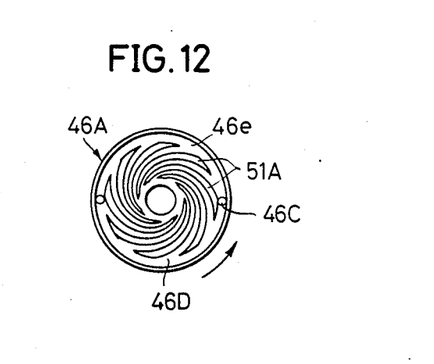
FIG. 12 is a bottom view showing a downstream-side cone shown in FIG. 11.

Next, the fourth embodiment of the turbine flowmeter of the present invention will be described in conjunction with FIGS. 11 and 12. In FIG. 11, those parts which are the same as those corresponding parts in FIG. 7 are designated by the same reference numerals and the description thereof will be omitted.

In the present embodiment, the spiral grooves 51a which are provided on the upper surface of the turbine rotor 51 of the second embodiment, are not provided on the rotor hub 51 of a rotor 49A. Instead, a plurality of spiral grooves 51A shown in FIG. 12 are provided on a bottom surface 46D of a down stream-side cone 46A. The spiral grooves 51A are provided on the inside of a ring-shaped groove 46e of the bottom surface 46D. The rotating direction of the rotor 49A which faces the bottom surface 46D is shown in FIG. 12 by an arrow. Each of the spiral grooves 51A converges to the central part of the bottom surface 46D in a direction of the turbine rotation, whereby the width of each of the spiral grooves 51A spirally decreases toward the central part of the bottom surface 46D.

In the present embodiment, as in the case of the second embodiment described before, the fluid in the gap between the upper surface of the turbine rotor 51 and the bottom surface 46D of the down stream-side cone 46A is rotated together with the turbine rotor 51 due to the viscosity of the fluid. As a result of a pumping action induced by the spiral grooves 51A of the turbine rotor 51, a film of fluid is formed in the gap in a manner similar to that of the second embodiment. Thus, a dynamic pressure bearing is similarly built up in the present embodiment.

In each of the embodiments, the spiral grooves which are illustrated as being formed in a recessed manner on the surface of the rotor hub or the stationary member with respect to other parts of the rotor hub or the stationary member, may be formed on the surface of the rotor hub or the stationary member as a plurality of spiral projections so as to relatively form a plurality of spiral grooves between the spiral projections. In the present specification, spiral grooves include such grooves.

Further, the present invention is not limited to these embodiments, but various variations and modifications may be made without departing from the scope of the present invention.

What is claimed is:

1. A turbine flowmeter comprising:
   a flowmeter housing through which a fluid to be measured flows;
   a turbine rotor rotatably provided within said flowmeter housing, said turbine rotor comprising a rotor hub and a plurality of blades which are unitarily provided on said rotor hub;
   bearing means for mechanically supporting said rotor hub in a rotatable manner by making mechanical contact with said rotor hub;
   a stationary member provided in said flowmeter housing in an opposing manner to said rotor hub; and
   dynamic pressure bearing means for building up a dynamic pressure bearing by said fluid between said rotor hub and said stationary member as said turbine rotor rotates so as to reduce the degree of bearing support by said bearing means, said turbine rotor being rotated in a predetermined direction, said dynamic pressure bearing means comprising a plurality of spiral grooves which are formed on a surface of said rotor hub facing said stationary member, each of said plurality of spiral grooves having a width which decreases from an outer periphery to a center of said rotor hub, each of said spiral grooves converging in a direction which is opposite to the rotating direction of said turbine rotor.

2. A turbine flowmeter comprising:
a flow meter housing through which a fluid to be measured flows;
a turbine rotor rotatably provided within said flowmeter housing, said turbine rotor comprising a rotor hub and a plurality of blades which are unitarily provided on said rotor hub, said rotor hub having a form of a hemispherical bowl;
bearing means for mechanically supporting said rotor hub in a rotatable manner by making mechanical contact with said rotor hub;
a stationary member provided in said flowmeter housing in an opposing manner to said rotor hub, said stationary member having a hemispherical surface at a part which faces said rotor hub; and
dynamic pressure bearing means for building up a dynamic pressure bearing by said fluid between said rotor hub and said stationary member as said turbine rotor rotates so as to reduce the degree of bearing support by said bearing means, said turbine rotor being rotated in a predetermined direction, said dynamic pressure bearing means comprising a plurality of spiral grooves which are formed on a surface of said rotor hub facing said stationary member, each of said plurality of spiral grooves having a width which decreases from an outer periphery to a center of said rotor hub, each of said spiral grooves converging in a direction which is opposite to the rotating direction of said turbine rotor, said spiral grooves being formed on an inner surface of said rotor hub.

3. A turbine flowmeter as claimed in claim 2 in which said flowmeter housing is arranged vertically in such a manner that the axis of said housing coincides with the direction of gravity and said fluid flows in vertically from the top to the bottom of said flowmeter housing, said bearing means comprises a pivot bearing part for pivotally supporting the center of said rotor hub, said pivot bearing part having a pivot shaft movable along the vertical direction, and having urging means for urging said pivot shaft in an upward direction, and said dynamic pressure bearing part substantially forms a dynamic pressure bearing when said turbine rotor is displaced downwardly by a thrust force due to the flow of said fluid and a gap between said rotor hub and said stationary member becomes small.

4. A turbine flowmeter comprising:
a flowmeter housing through which a fluid to be measured flows, said flowmeter housing being arranged vertically in such a manner that the axis of said flowmeter housing coincides with the direction of gravity and the fluid flows vertically from the bottom to the top of said flowmeter housing;
a turbine rotor rotatably provided within said flowmeter housing, said turbine rotor comprising a rotor hub and a plurality of blades which are unitarily provided on said rotor hub, said rotor hub being movable along the rotational axis of said rotor hub;
bearing means for mechanically supporting said rotor hub in a rotatable manner by making mechanical contact with said rotor hub, said bearing means comprising a pair of upper and lower pivot bearing parts for selectively supporting the center of said rotor hub at an upper or lower end of said rotor hub;
a stationary member provided in said flowmeter housing in an opposing manner to said rotor hub; and
dynamic pressure bearing means for building up a dynamic pressure bearing by said fluid between said rotor hub and said stationary member as said turbine rotor rotates so as to reduce the degree of bearing support by said bearing means;
said turbine rotor being rotated in a predetermined direction, said dynamic pressure bearing means comprising a plurality of spiral grooves which are formed on a surface of said rotor hub facing said stationary member, each of said plurality of spiral grooves having a width which decreases from an outer periphery to a center of said rotor hub, each of said spiral grooves converging in a direction which is opposite to the rotating direction of said turbine rotor, said rotor hub being supported by the lower pivot bearing part due to the weight of said rotor hub when the flow quantity is low, said rotor hub being displaced upwardly by a thrust force of said fluid and supported by said supper pivot bearing part when the flow quantity is high, and said dynamic pressure bearing means substantially forming a dynamic pressure bearing when said rotor hub moves upwardly by the thrust force of said fluid and a gap between said rotor hub and said stationary member decreases.

5. A turbine flowmeter comprising:
a flowmeter housing through which a fluid to be measured flows;
a turbine rotor rotatably provided within said flowmeter housing, said turbine rotor comprising a rotor hub and a plurality of blades which are unitarily provided on said rotor hub;
bearing means for mechanically supporting said rotor hub in a rotatable manner by making mechanical contact with said rotor hub;
a stationary member provided in said flowmeter housing in an opposing manner to said rotor hub; and
dynamic pressure bearing means for building up a dynamic pressure bearing by said fluid between said rotor hub and said stationary member as said turbine rotor rotates so as to reduce the degree of bearing support by said bearing means, said turbine rotor being rotated in a predetermined direction, said dynamic pressure bearing means comprising a plurality of spiral grooves which are formed on a surface of said rotor hub facing said stationary member, each of said plurality of spiral grooves having a width which decreases from an outer periphery to a center of said rotor hub, each of said spiral grooves converging in a direction which is opposite to the rotating direction of said turbine rotor, said stationary member comprising a downstream-side cone which is provided in an opposing manner to said rotor hub on the downstream side of said rotor hub, said cone being further provided with one or a plurality of fluid introducing holes which run through from the downstream part of said cone to a surface of the cone facing the surface of said rotor hub having said spiral grooves, said one or a plurality of fluid introducing holes introducing said fluid from the downstream part of said cone where the back pressure is high to a gap between said rotor hub and said stationary member, said cone being provided with a ring-shaped groove which opposes an outer peripheral part of said spiral grooves which are provided on said rotor hub, each of said fluid introducing holes having one end opening to said ring-shaped groove.

6. A turbine flow meter comprising:

a flow meter housing through which a fluid to be measured flows;

a turbine rotor rotatably provided within said flowmeter housing, said turbine rotor comprising a rotor hub and a plurality of blades which are unitarily provided on said rotor hub;

bearing means for mechanically supporting said rotor hub in a rotatable manner by making mechanical contact with said rotor hub;

a stationary member provided in said flowmeter housing in an opposing manner to said rotor hub; and dynamic pressure bearing means for building up a dynamic pressure bearing by said fluid between said rotor hub and said stationary member as said turbine rotor rotates so as to reduce the degree of bearing support by said bearing means, said turbine rotor being rotated in a predetermined direction, said dynamic pressure bearing means comprising a plurality of spiral grooves which are formed on a surface of said stationary member, each of said plurality of spiral grooves having a width which decreases from an outer periphery to a center of said stationary member, each of said spiral grooves converging in the rotating direction of said turbine rotor.

7. A turbine flowmeter as claimed in claim 6 in which said rotor hub has a form of a hemispherical bowl, said stationary member has a hemispherical outer surface at a part which faces said rotor hub, and said spiral grooves are formed on said hemispherical outer surface of said stationary member.

8. A turbine flowmeter as claimed in claim 6 in which said stationary member comprises a downstream-side cone which is provided in an opposing manner to said rotor hub on the downstream side of said rotor hub, said cone is provided with said spiral grooves on a bottom surface thereof facing said rotor hub, said cone is further provided with one or a plurality of fluid introducing holes which run through from the downstream part of said cone to a surface of the cone facing the surface of said rotor hub, and said one or a plurality of fluid introducing holes introduce said fluid from the downstream part of said cone where the back pressure is high to a gap between said rotor hub and said stationary member.

* * * * *